(12) United States Patent
Masaryk et al.

(10) Patent No.: US 8,500,008 B2
(45) Date of Patent: Aug. 6, 2013

(54) METHOD AND SYSTEM OF ELECTRONIC PAYMENT TRANSACTION, IN PARTICULAR BY USING CONTACTLESS PAYMENT MEANS

(75) Inventors: Michal Masaryk, Bratislava (SK); Miroslav Florek, Bratislava (SK)

(73) Assignee: Logomotion, S.R.O (SK)

( * ) Notice: Subject to any disclaimer, the term of this patent is extended or adjusted under 35 U.S.C. 154(b) by 220 days.

(21) Appl. No.: 12/866,774

(22) PCT Filed: Apr. 23, 2010

(86) PCT No.: PCT/IB2010/051779
§ 371 (c)(1),
(2), (4) Date: Aug. 9, 2010

(87) PCT Pub. No.: WO2010/122520
PCT Pub. Date: Oct. 28, 2010

(65) Prior Publication Data
US 2011/0042456 A1 Feb. 24, 2011

(30) Foreign Application Priority Data

Apr. 24, 2009 (SK) .................................. 50024-2009

(51) Int. Cl.
*G06K 7/00* (2006.01)
(52) U.S. Cl.
USPC .......................................................... 235/380
(58) Field of Classification Search
USPC ................................................ 235/375–380
See application file for complete search history.

(56) References Cited

U.S. PATENT DOCUMENTS

| | | | |
|---|---|---|---|
| 5,574,470 A | | 11/1996 | de Vall |
| 5,608,417 A | | 3/1997 | de Vall |
| 6,062,472 A | * | 5/2000 | Cheung ......................... 235/380 |
| 6,070,795 A | * | 6/2000 | Feiken .......................... 235/380 |

(Continued)

FOREIGN PATENT DOCUMENTS

| | | |
|---|---|---|
| CN | 1450782 | 10/2003 |
| CN | 1627321 | 6/2005 |

(Continued)

OTHER PUBLICATIONS

"EMV Mobile Contactless Payment: Technical Issues and Position Paper", www.emvco.com/mobile.aspx, © Oct. 11, 2007, accessed Apr. 20, 2009, 37 pages.

(Continued)

*Primary Examiner* — Christle Marshall
(74) *Attorney, Agent, or Firm* — Woodcock Washburn LLP

(57) ABSTRACT

A method of electronic payment transaction is characterized by the fact that during processing of one payment transaction, a communication link (3) between the card (1) and the terminal (2) is interrupted and the ARPC answering file is received to the card (1) after the original communication link (5) is interrupted. Two phases are separated by a reset of the card (1) where in the second phase initial payment data (ARQC) are used.

Electronically signed ARQC payment file is stored in the card's (1) memory for at least until the corresponding time ARPC answering file is of received and processed. The solution enables to place the mobile phone with a payment card (1) near to the terminal's (2) reader twice. The first time, a request for on-line authorization is generated and during the second touch the information from the payment processor (5) is recorded into the payment application.

16 Claims, 5 Drawing Sheets

(56) References Cited

U.S. PATENT DOCUMENTS

| | | | |
|---|---|---|---|
| 6,070,796 A | 6/2000 | Sirbu | |
| 6,450,407 B1 | 9/2002 | Freeman et al. | |
| 6,615,243 B1 | 9/2003 | Meggeid et al. | |
| 6,745,935 B1 * | 6/2004 | Grieu et al. | 235/376 |
| 6,828,670 B2 | 12/2004 | Hayana et al. | |
| 6,976,011 B1 | 12/2005 | Capitant et al. | |
| 7,103,575 B1 | 9/2006 | Linehan | |
| 7,357,309 B2 | 4/2008 | Ghosh et al. | |
| 7,364,092 B2 | 4/2008 | Narendra et al. | |
| 7,374,100 B2 | 5/2008 | Jei et al. | |
| 7,436,965 B2 | 10/2008 | Sherman | |
| 7,458,518 B2 | 12/2008 | Fukuda et al. | |
| 7,481,358 B2 * | 1/2009 | Honjo et al. | 235/375 |
| 7,568,065 B2 * | 7/2009 | D'Athis | 711/103 |
| 7,581,678 B2 | 9/2009 | Narendra et al. | |
| 7,689,932 B2 | 3/2010 | Maktedar | |
| 7,775,442 B2 | 8/2010 | Saarisalo | |
| 7,775,446 B2 | 8/2010 | Ochi et al. | |
| 7,805,615 B2 | 9/2010 | Narendra et al. | |
| 7,828,214 B2 | 11/2010 | Narendra et al. | |
| 8,055,184 B1 | 11/2011 | DiMartino et al. | |
| 8,127,999 B2 * | 3/2012 | Diamond | 235/492 |
| 2001/0005832 A1 | 6/2001 | Cofta | |
| 2002/0038287 A1 | 3/2002 | Villaret et al. | |
| 2002/0062249 A1 | 5/2002 | Iannacci | |
| 2002/0147658 A1 | 10/2002 | Kwan | |
| 2002/0163479 A1 | 11/2002 | Lin | |
| 2003/0055738 A1 | 3/2003 | Alie | |
| 2003/0138135 A1 | 7/2003 | Chung et al. | |
| 2004/0019564 A1 | 1/2004 | Goldthwaite et al. | |
| 2004/0066278 A1 | 4/2004 | Hughes et al. | |
| 2005/0072595 A1 | 4/2005 | Cho | |
| 2005/0092835 A1 | 5/2005 | Chung et al. | |
| 2005/0116050 A1 | 6/2005 | Jei et al. | |
| 2005/0125745 A1 | 6/2005 | Engestrom | |
| 2005/0222949 A1 | 10/2005 | Inotay et al. | |
| 2005/0269401 A1 | 12/2005 | Spitzer et al. | |
| 2005/0269402 A1 | 12/2005 | Spitzer et al. | |
| 2006/0143578 A1 | 6/2006 | Maktedar | |
| 2006/0146023 A1 | 7/2006 | Kidron | |
| 2006/0152288 A1 | 7/2006 | Peng et al. | |
| 2006/0186209 A1 | 8/2006 | Narendra et al. | |
| 2006/0219776 A1 | 10/2006 | Finn | |
| 2006/0224470 A1 | 10/2006 | Garcia et al. | |
| 2006/0226217 A1 | 10/2006 | Narendra et al. | |
| 2006/0255160 A1 | 11/2006 | Winkler | |
| 2007/0014407 A1 | 1/2007 | Narendra et al. | |
| 2007/0014408 A1 | 1/2007 | Narendra et al. | |
| 2007/0016957 A1 | 1/2007 | Seaward et al. | |
| 2007/0106564 A1 | 5/2007 | Matotek et al. | |
| 2007/0106619 A1 | 5/2007 | Holdsworth | |
| 2007/0125840 A1 | 6/2007 | Law et al. | |
| 2007/0152035 A1 | 7/2007 | Adams et al. | |
| 2007/0158438 A1 | 7/2007 | Fukuda et al. | |
| 2007/0171079 A1 | 7/2007 | Saito | |
| 2007/0233615 A1 | 10/2007 | Tumminaro | |
| 2007/0235539 A1 | 10/2007 | Sevanto et al. | |
| 2007/0241180 A1 | 10/2007 | Park et al. | |
| 2007/0293155 A1 | 12/2007 | Liao | |
| 2008/0011833 A1 | 1/2008 | Saarisalo | |
| 2008/0048036 A1 | 2/2008 | Matsumoto et al. | |
| 2008/0059375 A1 | 3/2008 | Abifaker | |
| 2008/0093467 A1 | 4/2008 | Narendra et al. | |
| 2008/0103972 A1 | 5/2008 | Lanc | |
| 2008/0120129 A1 | 5/2008 | Seubert et al. | |
| 2008/0207124 A1 | 8/2008 | Raisanen et al. | |
| 2008/0233906 A1 | 9/2008 | Mitomo et al. | |
| 2008/0270246 A1 | 10/2008 | Chen | |
| 2009/0063312 A1 | 3/2009 | Hurst | |
| 2009/0065571 A1 | 3/2009 | Jain | |
| 2009/0065572 A1 | 3/2009 | Jain | |
| 2009/0069049 A1 | 3/2009 | Jain | |
| 2009/0069050 A1 | 3/2009 | Jain et al. | |
| 2009/0069051 A1 | 3/2009 | Jain et al. | |
| 2009/0069052 A1 | 3/2009 | Jain et al. | |
| 2009/0070272 A1 | 3/2009 | Jain | |
| 2009/0070691 A1 | 3/2009 | Jain | |
| 2009/0070861 A1 | 3/2009 | Jain | |
| 2009/0088077 A1 | 4/2009 | Brown et al. | |
| 2009/0098825 A1 | 4/2009 | Huomo et al. | |
| 2009/0108063 A1 | 4/2009 | Jain et al. | |
| 2009/0119190 A1 | 5/2009 | Realini | |
| 2009/0124273 A1 | 5/2009 | Back | |
| 2009/0132418 A1 | 5/2009 | Morsillo et al. | |
| 2009/0143104 A1 | 6/2009 | Loh et al. | |
| 2009/0157936 A1 | 6/2009 | Goss et al. | |
| 2009/0191812 A1 | 7/2009 | Teruyama et al. | |
| 2009/0193491 A1 | 7/2009 | Rao | |
| 2009/0199206 A1 | 8/2009 | Finkenzeller et al. | |
| 2009/0199283 A1 | 8/2009 | Jain | |
| 2009/0200371 A1 | 8/2009 | Kean et al. | |
| 2009/0261172 A1 | 10/2009 | Kumar et al. | |
| 2009/0265544 A1 | 10/2009 | Moona et al. | |
| 2009/0265552 A1 | 10/2009 | Moshir et al. | |
| 2009/0298540 A1 | 12/2009 | Narendra et al. | |
| 2009/0307139 A1 | 12/2009 | Mardikar et al. | |
| 2009/0307142 A1 | 12/2009 | Mardikar et al. | |
| 2009/0319287 A1 | 12/2009 | Hammad et al. | |
| 2010/0012721 A1 | 1/2010 | Jain et al. | |
| 2010/0023449 A1 | 1/2010 | Skowronek et al. | |
| 2010/0044444 A1 | 2/2010 | Jain et al. | |
| 2010/0045425 A1 | 2/2010 | Chivallier | |
| 2010/0062808 A1 | 3/2010 | Cha et al. | |
| 2010/0063893 A1 | 3/2010 | Townsend | |
| 2010/0197224 A1 | 8/2010 | Lahdenniemi et al. | |
| 2010/0203870 A1 | 8/2010 | Hubinak et al. | |
| 2010/0205432 A1 | 8/2010 | Corda | |
| 2010/0213265 A1 | 8/2010 | Narendra et al. | |
| 2010/0258639 A1 | 10/2010 | Florek et al. | |
| 2010/0262503 A1 | 10/2010 | Florek et al. | |
| 2010/0274677 A1 | 10/2010 | Florek et al. | |
| 2010/0274726 A1 | 10/2010 | Florek et al. | |
| 2010/0323617 A1 | 12/2010 | Hubinak et al. | |
| 2011/0196796 A1 | 8/2011 | Florek et al. | |
| 2011/0282753 A1 | 11/2011 | Mullen et al. | |

FOREIGN PATENT DOCUMENTS

| | | |
|---|---|---|
| CN | 1835007 | 9/2006 |
| CN | 1870012 | 11/2006 |
| CN | 101013903 | 8/2007 |
| CN | 101136123 | 3/2008 |
| CN | 101329801 | 12/2008 |
| CN | 101339685 | 1/2009 |
| CN | 101351819 | 1/2009 |
| DE | 10130019 A1 | 1/2003 |
| DE | 10 2005 026435 B3 | 12/2006 |
| DE | 10 2006 019628 | 10/2007 |
| DE | 10 2007 019272 A1 | 10/2007 |
| EP | 0704928 A2 | 4/1996 |
| EP | 601091 B1 | 12/1997 |
| EP | 1365451 A1 | 11/2003 |
| EP | 1450233 A2 | 8/2004 |
| EP | 1536573 | 6/2005 |
| EP | 1729253 | 12/2006 |
| EP | 1752902 A2 | 2/2007 |
| EP | 1752903 A2 | 2/2007 |
| EP | 1785915 A | 5/2007 |
| EP | 1943606 A2 | 7/2008 |
| EP | 2390817 | 11/2011 |
| FR | 0611189 | 9/1926 |
| FR | 0611190 | 9/1926 |
| GB | 2390509 A | 1/2004 |
| GB | 2424151 A | 9/2006 |
| GB | 2432031 A | 9/2007 |
| IE | 980562 | 2/2000 |
| JP | 2003-131808 | 5/2003 |
| JP | 2004-348235 A | 12/2004 |
| JP | 2005-284862 A | 10/2005 |
| JP | 2006-033229 | 2/2006 |
| JP | 2007-060076 A | 3/2007 |
| JP | 2007-166379 | 6/2007 |
| JP | 2007-304910 A | 11/2007 |
| JP | 2008-083867 A | 4/2008 |
| KR | 2002-0012738 | 2/2002 |

| | | |
|---|---|---|
| KR | 2002-0051696 | 6/2002 |
| KR | 2002-0073106 | 9/2002 |
| KR | 2003-0005088 A | 1/2003 |
| KR | 2004-0012401 A | 2/2004 |
| KR | 2004-0060249 | 7/2004 |
| KR | 2004-0089800 A | 10/2004 |
| KR | 2005-0008622 A | 1/2005 |
| KR | 2007-0093133 | 9/2007 |
| SI | 22595 | 2/2009 |
| WO | WO 03/012717 A1 | 2/2003 |
| WO | WO 2005/057316 | 6/2005 |
| WO | WO 2005/086456 | 9/2005 |
| WO | WO 2006/009460 | 1/2006 |
| WO | WO 2007/076456 A | 7/2007 |
| WO | WO 2007/105469 | 9/2007 |
| WO | WO 2007/136939 | 11/2007 |
| WO | WO 2008/012416 A2 | 1/2008 |
| WO | WO 2008/041861 A | 4/2008 |
| WO | WO 2008/063990 | 5/2008 |
| WO | WO 2008/105703 A1 | 9/2008 |
| WO | WO 2009/014502 | 1/2009 |
| WO | WO 2009/087539 | 7/2009 |
| WO | WO 2009/118681 | 10/2009 |
| WO | WO 2010/011670 | 1/2010 |
| WO | WO 2010/023574 | 3/2010 |
| WO | WO 2010/032215 | 3/2010 |
| WO | WO 2010/032216 | 3/2010 |
| WO | WO 2010/044041 | 4/2010 |
| WO | WO 2010/097777 | 9/2010 |
| WO | WO 2010/122520 | 10/2010 |
| WO | WO 2010/128442 | 11/2010 |
| WO | WO 2010/131226 | 11/2010 |

OTHER PUBLICATIONS

"NFC Frequently Asked Questions," NFC for Customers, www.nfc-forum.org., Retrieved from the internet on Nov. 7, 2008, 5 pages.

Smart Card Alliance, "RF-Enabled Applications and Technology: Comparing and Contrasting RFID and RF-Enabled Smart Cards", Smart Card Alliance Identity Council, Jan. 2007, 7 pages.

Smart Card Alliance: "Proximity Mobile Payments: Leveraging NFC and the Contactless Financial Payments Infrastructure A Smart Card Alliance Contactless Payments Council White Paper", www.smartcardalliance.org, © Sep. 1, 2007, accessed Nov. 7, 2008, 10 pages.

"Intelligent Mouse", IBM Technical Disclosure Bulletin, International Business Machines Corp., Thornwood, US, Feb. 1, 1995, 38(2), p. 463.

Finkenzeller (Ed.), "RFID-Handbuch: Grundlagen und praktische Anwendungen Induktiver Funkanlagen, Transponder und kontaktloser Chipkarten", Jan. 1, 2002, 225-231 (English abstract attached).

Balfe et al., "Augmenting Internet-Based Card not Present Transactions with Trusted Computing: An Analysis", Royal Holloway, University of London, Oct. 16, 2006, 25 pages.

Balfe et al., "e-EMV: Emulating EMV for Internet Payments with Trusted Computing Technologies", Royal Holloway, University of London, Oct. 31, 2008, 12 pages.

Khu-Smith et al., "Using EMV Cards to Protect E-Commerce Transactions", Information Security Group, Royal Holloway, University of London, 2002, 12 pages.

Madlmayr et al., "Management of Multiple Cards in NFC-Deivces", LNCS, 2008, 21 pages.

Wikipedia, "Bluetooth", Wikipedia, The Free Encyclopedia, http://enwikipedia.org/wiki/bluetooth, accessed Apr. 8, 2012, 19 pages.

Wikipedia, "Cellular Frequencies" Wikipedia, The Free Encyclopedia, http://en.wikipedia.org/wiki/cellular_frequencies, accessed Apr. 8, 2012, 5 pages.

* cited by examiner

METHOD AND SYSTEM OF ELECTRONIC PAYMENT TRANSACTION, IN PARTICULAR BY USING CONTACTLESS PAYMENT MEANS

CROSS-REFERENCE TO RELATED APPLICATIONS

This application is the U.S. National Stage of International Application No. PCT/IB2010/051779, filed Apr. 23, 2010, which claims priority under 35 USC 119 (A-D) of Slovak Patent Application No. PP50024-2009, filed Apr. 24, 2009, the disclosures of which are incorporated herein by reference in their entirety.

FIELD OF INVENTION

The invention relates to a procedure and a system of an electronic payment application with the use of payment means in a form of a payment card. It deals with a method of a direct debit payment transaction by using contactless payment means that is adjusted so it can be inserted into a mobile communication device.

PRESENT TECHNOLOGY STATUS

POS (point of sale) terminals are commonly used to process electronic payment transactions using different chip payment cards. These terminals are connected to a remote payment processor in the form of a clearing centre belonging to a payment card issuer or a bank. At the beginning of a payment process, the chip of the payment card is reset into its initial position. After reset, the information about the card and terminal type will be exchanged between the card and terminal. This basic identification brings the connection between the card and the terminal into a position allowing mutual communication as well as communication towards the payment processor server.

The POS terminal sends data about the required payment into the card, the data structure includes for example amount, currency, date and similar. The terminal also requests the card to give a statement. The card, according to its settings generates an answer and signs it with its electronic signature. The card's response in the form of "TC" (Transaction Certificate) means an acceptance of off-line payment where the authorization by a payment processor is not needed. The response in the form of "AAC" (Application Authentication Cryptogram) means that the payment will not be accepted by the card under any conditions. The subject matter of this invention is a method, a procedure of a payment process during generation of the response in the ARQC (Authorization Request Cryptogram) form. Such answer means that the card requires authentication and co-operation with a payment processor server.

After an answer is generated in the form of a payment file, mainly of ARQC type, the card sends this encrypted payment file to the processor and waits until the processor's answer is received. While waiting, the payment card must remain in touch with the terminal to create a continuous communication channel between the card and the payment processor. The interruption of this channel will cause termination of the payment process. If the payment processor sends back a ARPC response file (Authorization Response Cryptogram) into the card, then this file is sent via terminal into the payment card and the payment card decodes the instructions for further procedure (in particular as ARPC) from the response file and reports the result to the terminal in the form of TC eventually AAC.

The essential feature of the communication method between the payment card and the terminal/payment processor that is known up till now is a constant connection, a continuous, uninterrupted channel of the given cashless payment hardware elements during bidirectional communication. This communication lasts approximately some seconds, eventually tenths of seconds. The interruption of the connection between the card and the terminal would cause a new restart of the card application, which will be recorded for example via incrementation of its counter. Change of counter data would elicit a change of newly generated payment file ARQC and after an interruption it would not be possible to finish the payment process successfully using the data that were originally generated before the connection was interrupted. When using standard payment cards connected through a contact there is no problem to keep a reliable communication link since this link is interrupted only in the case when the card is taken early from the slot of the appropriate reader.

With the increasing usage of contactless payment means there appears the problem with the stability of the communication channel. It is not suitable to require from the payer to hold his contactless payment means uninterruptedly and with concentration within the reach of a contactless reader during the whole time of payment process. The contactless reader usually has area limited reach in order to prevent any interference with other devices, to lower energetic demands for creation of contactless field and to reduce safety risks. A solution which can phase a payment communication process into some interrupted phases is required. However, until now no procedures and methods meeting this demand are known.

A solution in which a contactless payment card is adapted also for a contact connection with the terminal is used. In such a configuration most of the payments are realized via contactless link between a payment card and a terminal during which the payment card does not wait for a response from the payment processor. To achieve bidirectional communication between the card and the payment processor server it is necessary for the card to be in contact connection with the terminal regularly, for instance in every tenth payment. Then the card receives instructions from the payment processor and executes them. This configuration lowers the user's comfort and above all it demands contact interface of the payment card so it is not applicable for payments that use payment cards within a mobile communication device. It is not possible to require for the different mobile communication devices, e.g. mobile phones to be connected with the POS terminal in a contact way.

BACKGROUND TO INVENTION

The disadvantages mentioned above are eliminated significantly by a method of a contactless payment transaction, in particular with the use of contactless payment means which includes a method by which after the reset of the card, the card receives payment data from the payment terminal. Based on these data a payment file is created and electronically signed, mainly in the form of ARQC. This payment file is sent via a link between the card and the payment terminal to the payment processor, subsequently the card receives back a response file from a processor, mainly in the form of ARPC, which includes even data about the original payment file in an encoded form. The card will process and decode the response file and consequently decides, defines and sends back an affirmative or negative statement towards the payment, mainly in the TC or AAC form according to this invention to the terminal. The subject matter of this invention is in the fact that during procession of one payment transaction, the communication link between the card and the terminal is interrupted. This interruption may arise basically immediately after the payment file is sent from the card into the terminal. The initial reception of data from the terminal, generation of a payment file in the form of ARQC and its sending into the terminal lasts approximately some milliseconds and it is realizable during a comfortable placement of the card near to the terminal's reader. The response file from the payment processor is received by the card after the original communication link between the card and the terminal is interrupted. The two phases of the payment transaction processing and communication mentioned are divided by the card's reset, while in the second phase the data created on the card before the interruption of the communication link between the card and the terminal are used. The new reset of the card during one payment transaction is induced by the reestablishment of the communication link.

The above mentioned communication mechanism can be realized in a safe way and at the same time with little interventions into common EMV (Europay, MasterCard, VISA) procedures in such a way that an electronically signed payment file, in particular in the form of ARQC is stored into the memory of the card whereas the payment file is stored in a memory for at least until the time of receiving and proceeding a particular answering file from a payment processor, mainly as ARPC. Storage of a payment file, in particular as ARQC is an essential feature of the submitted solution since it allows to divide the process of payment transaction into phases in the way that interruption and procedure leading to the second phase do not elicit cancellation and closing of the in progress payment transaction.

Card decodes the received answering file, gains information about a payment file which was used by a payment processor during creation of the answering file. ARQC payment file is encoded in an answering file where other instructions and scripts for the card can be stored. The card compares the originally created and stored payment file to a payment file included in answering file, subsequently the card creates declined or accepted statement to the payment. Accepting statement to the payment is on the card conditioned by equality of originally created and on the card stored payment file with a payment file generated from decoded answering file. It means that a card, in the second processing phase besides other operations also compares the stored ARQC file with the ARQC file, which served as a base of created ARPC at a payment processor.

After receiving an answering file, terminal requires a reconnection of a communication link of the card and the terminal. After reestablishment of a communication link of the card and the terminal, card requires from the terminal to send again payment data in a form of CDOL (Card Risk Management Data Object List) which are, compared to original CDOL supplemented with an answer from a payment processor.

It is advantageous if a payment card is included in a mobile communication device, such as a mobile phone. From the point of view of possible expansion of such payment means it is suitable if the payment card is located in a memory card of the micro SD or mini SD or SD type since mobile phones commonly have slots to enter broadening memory cards.

In existing one-phase communication system during payment transaction the backward communication from the payment processor towards the card was always realized through the same communication channel as was used when sending the payment file to the payment processor. The new method presented with two phases enables to divide these phases not only from the time but also from the hardware point of view. A different communication path can be used for transfer of answering file than was used for transfer of payment file. It can be a connection via a mobile communication network to which mobile communication device encompassing the card is logged. The mobile communication network is used for sending of the answering file and the answering file enters the card through the mobile phone, which receives it in the SMS format. This can happen after the terminal received the answering file, but when the communication link between the terminal and the card was not reestablished in the preset time limit. Then the terminal sends information on this status to the payment processor and the one organizes sending of the answering file into the card in a different way.

It is suitable that in case the same communication path via the POS terminal is used, this terminal logs to the card after receiving the answering file from the payment processor as a terminal with an identification that is different from the payment terminal identification in the phase when the payment file was sent to the payment processor. Basically it means that the terminal with different identification prefix gives the card a signal that it tries to connect as a postprocess terminal in order to finish the already started payment transaction. In this kind of configuration the terminal keeps the answering file as a preparation for reestablishment of the communication link with the card.

The disadvantages mentioned in the present technology status are eliminated significantly also by a method of contactless payment transaction, especially with the usage of contactless payment device encompassing a payment card, a terminal, a connection between the terminal and the payment processor according to this invention. The subject matter of this invention is also in the fact that the payment card is equipped with a memory for storage of the payment file, favorably a payment file in a form of ARQC, where the payment file is stored in the memory even after the card is reset when the communication link between the card and the terminal is ended. The terminal is equipped with a memory for temporary storage of answering file, mainly in the form of ARPC and is adjusted to the change of its identification data after the answering file is received. From the point of reaching required security view it is necessary that the card's memory for the storage of payment file is in the form of a secure element.

In advantageous configuration, the system can be set in such a way that the payment card is within the mobile communication device, preferably on a memory card of the micro SD or mini SD or SD form and in which the memory card encompasses a communication element for the connection with the terminal. By doing this an update of the mobile phone is reached and not only for the function of the payment card carrier, or carrier of various payment cards respectively, but also for the creation of the communication channel between the mobile phone and the terminal. This communication will run mainly in accordance with the NFC standard.

DESCRIPTION OF DRAWINGS

The invention is described in more details on the FIGS. 1 to 5 where.

Figure 1:
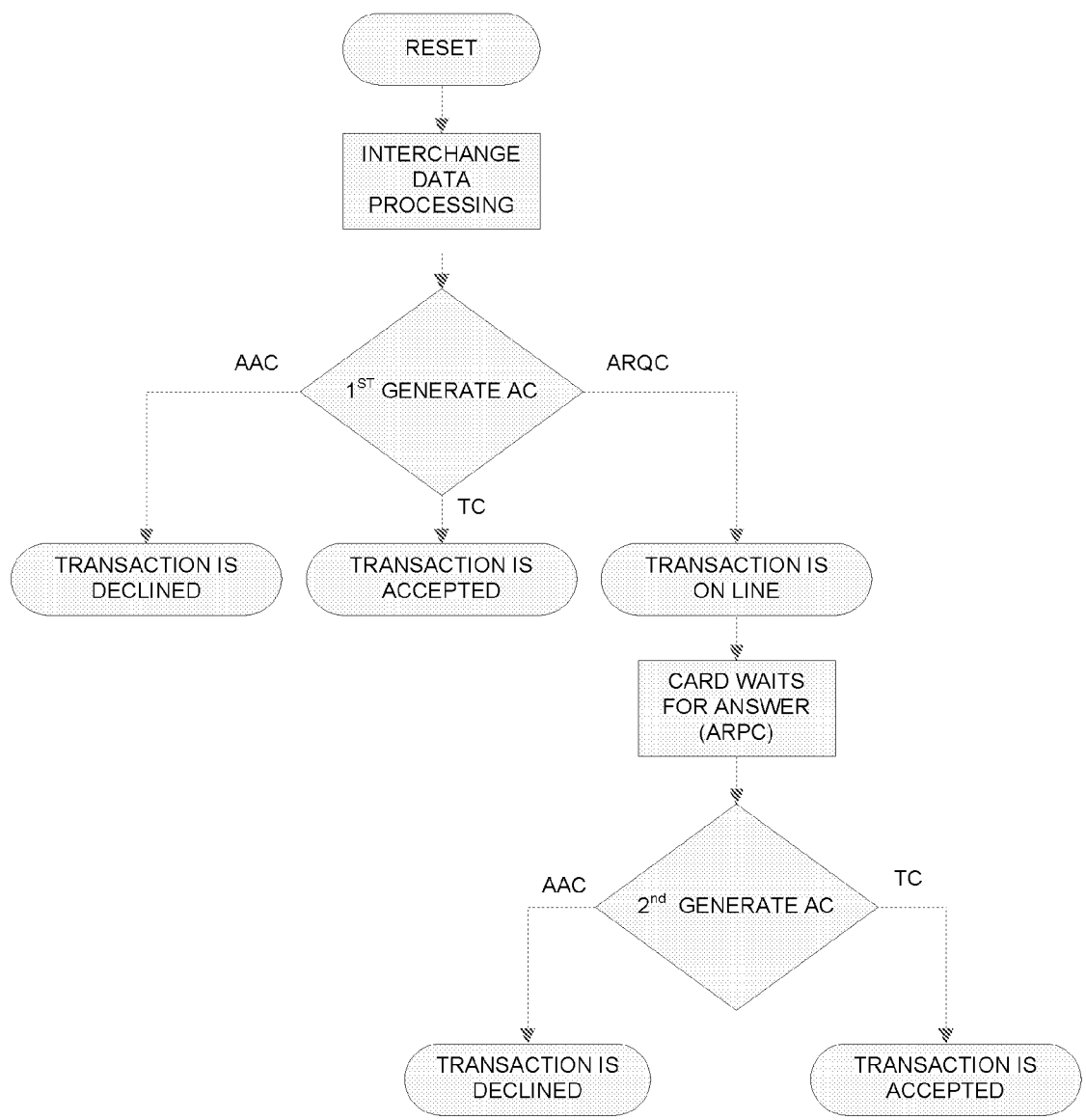
FIG. 1 shows an algorithm of existing method and connection for electronic payment transactions.
Figure 2:
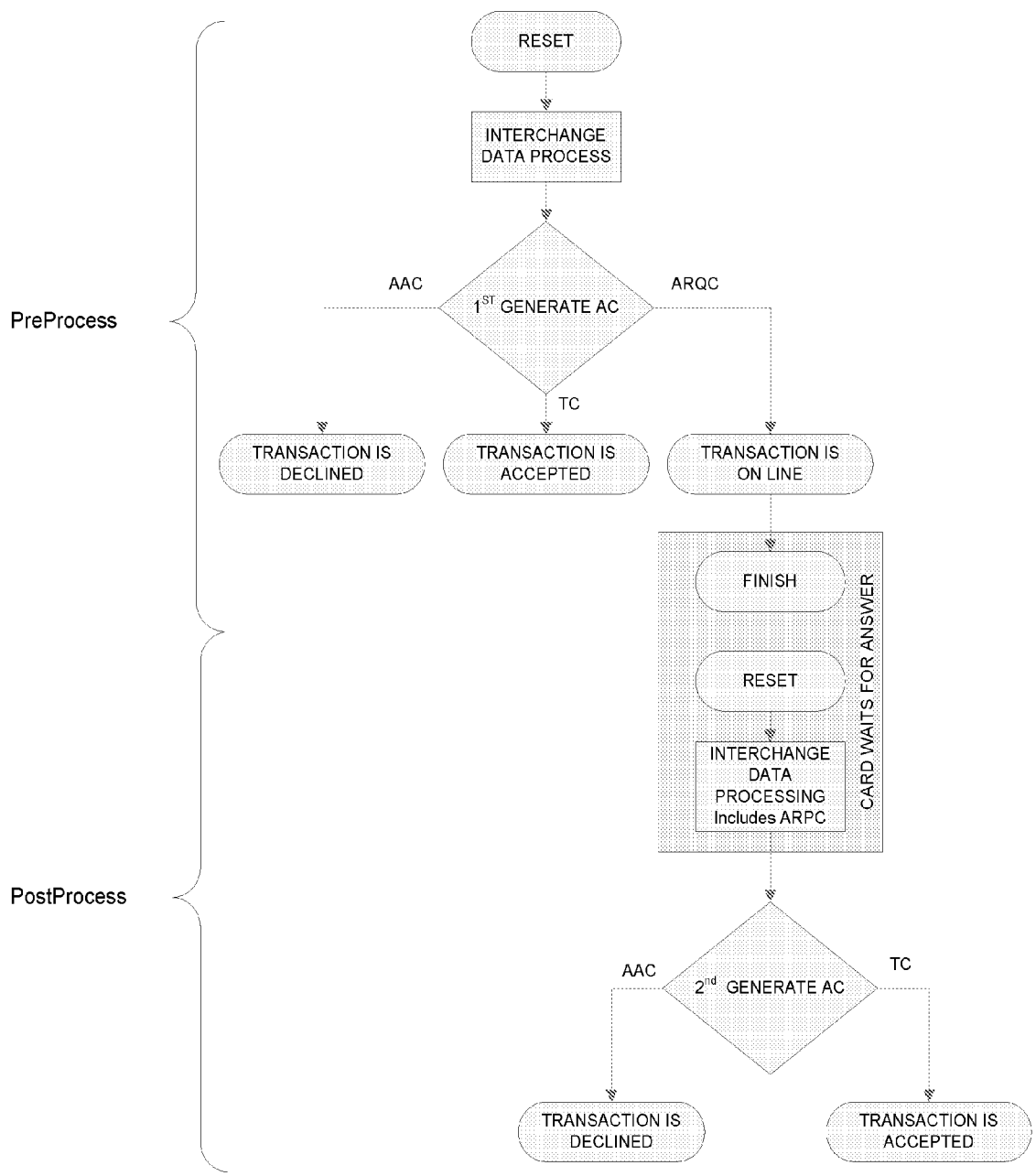

The FIG. 2 shows an algorithm with two separable phases of processing an electronic payment application.

Figure 3:
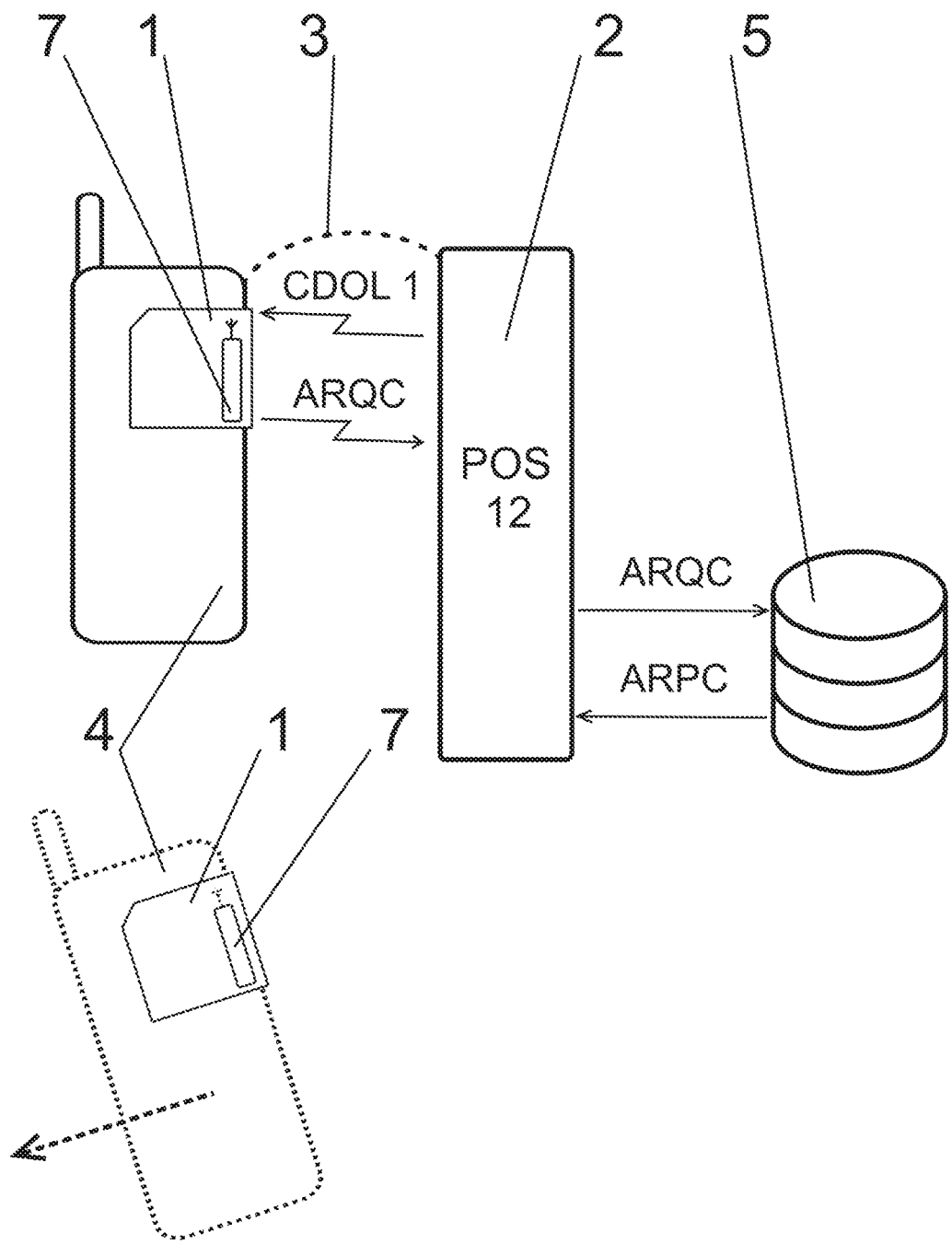

The FIG. 3 represents a system connection scheme for a contactless, direct debit transaction over a mobile phone equipped with a payment card on an inserted memory card having an antenna in the first phase, so in pre-processing. The course of orders and a flow of files is shown in from the top downward order.

Figure 4:
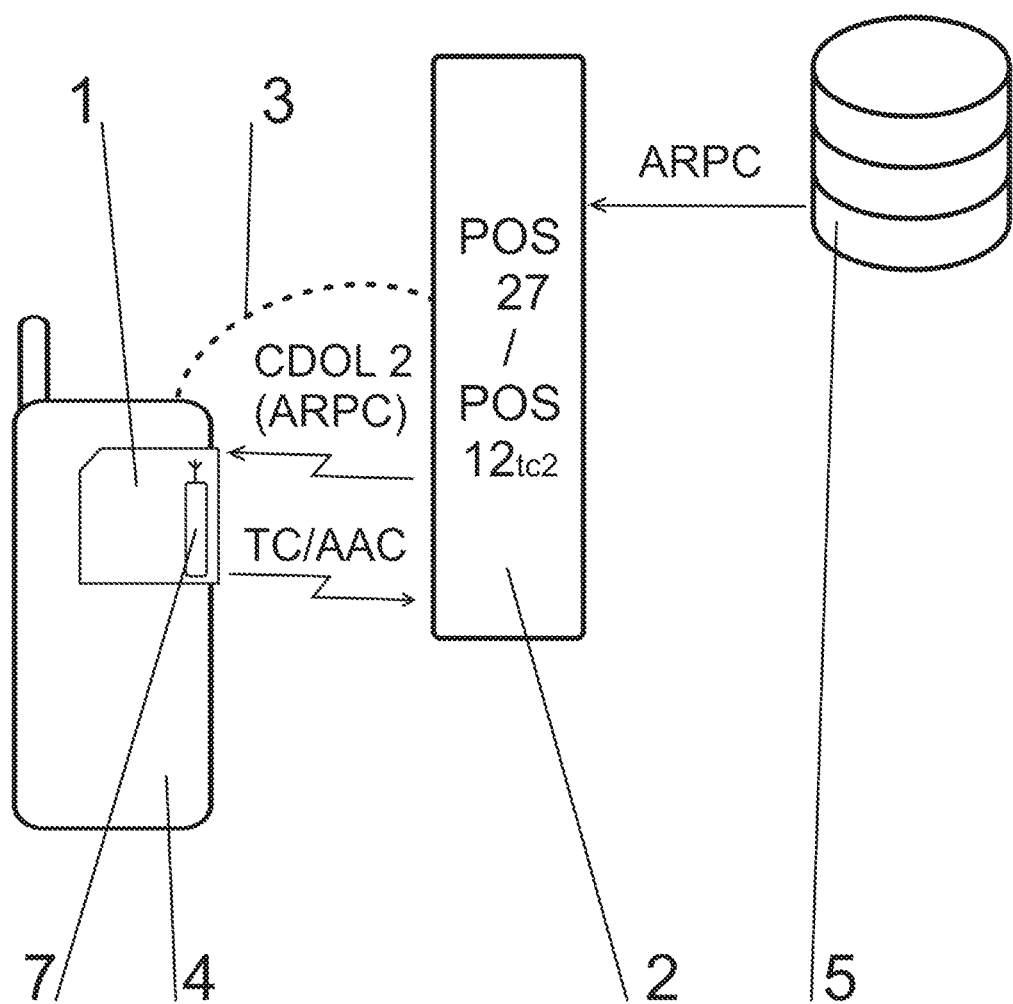

In the FIG. 4 there is a connection scheme relating to a scheme according to the FIG. 3 where shown is the second phase post-processing with the transfer on the card via a terminal. The course of orders and a flow of files is shown in from the top downward order.

Figure 5:
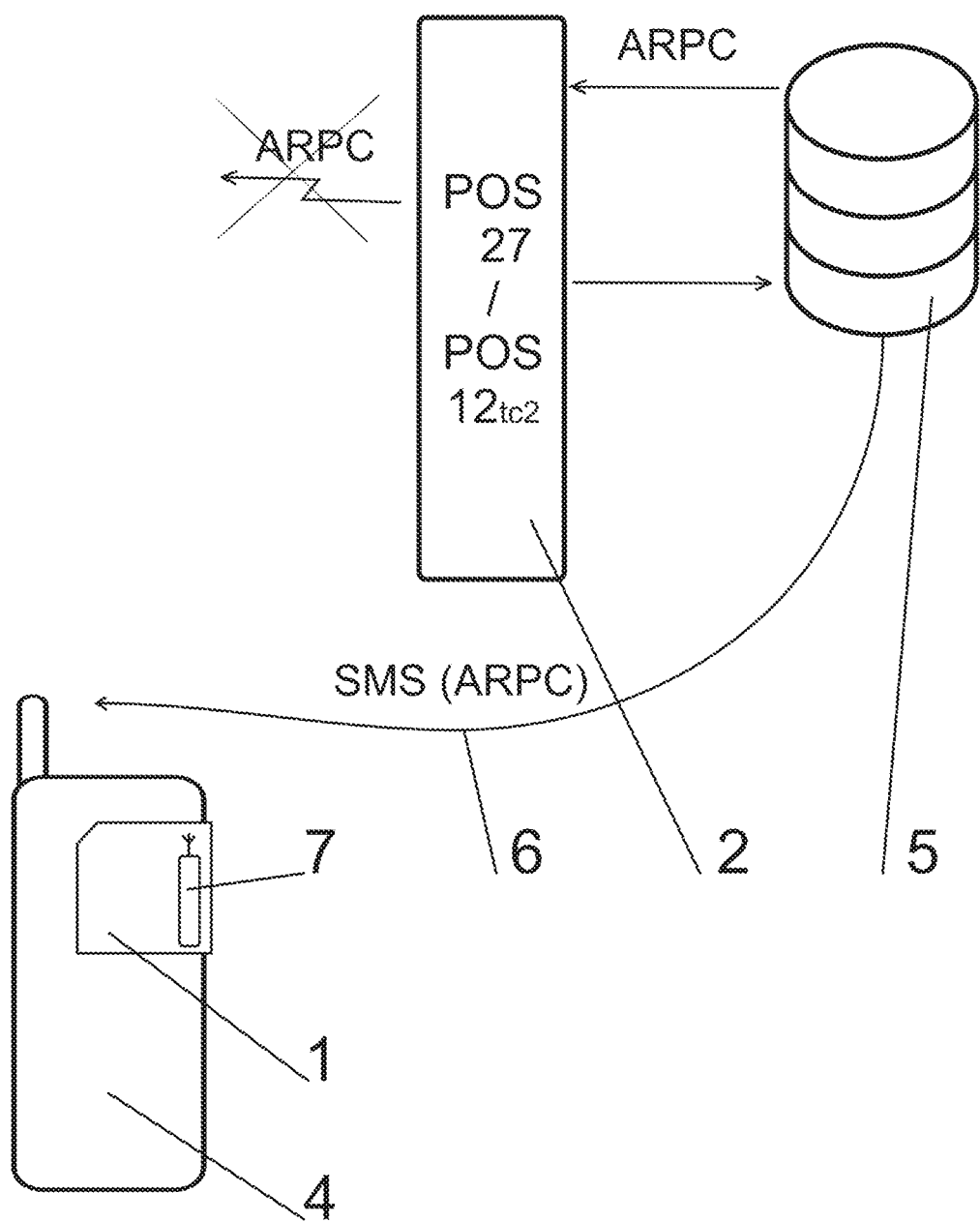

In the FIG. 5 there is a connection scheme related to the scheme shown on FIG. 3, however here is shown the second phase, the post-processing in the version of ARPC transfer over SMS message. The course of orders and a flow of files is shown in from the top downward order.

EXAMPLES OF APPLICATION

Example 1

In this example the system contains a mobile communication device 4, a terminal 2 with NFC reader, a payment processor server 5, a connection between the terminal 2 and the payment processor 5 server. The mobile communication device 4 is represented by the e.g. NOKIA 6131 mobile phone. The removable card 1 with a memory of micro SD format is inserted into the slot of the mobile communication device 4. A payment card 1 and also an NFC communication element 7 is located on a removable card 1 with a memory having common standardized dimensions. The card 1 is equipped with a memory for storage of the payment file, with the memory being in the form of a secure element, respectively in a shape of actual domain of the secure element. The ARQC payment file is stored her even after the card 1 is reset. The card's 1 reset is elicited by re-connection of the card 1 to the terminal 2 after interrupting a communication link 3 between the card 1 and terminal 2 in the first phase of the transaction. The terminal 2 is equipped with a memory for temporary storage of the answering file, in particular in the form of ARPC. The terminal 2 has a variable identification prefix; terminal 2 is adjusted to change its identification data after an answering file is received. In the first phase, the terminal 2 registers as a terminal 2 of the 12 type (POS terminal 2 attended by a salesperson) and in the second phase as a terminal 2 of the 12tc2 type or possibly of the 27 type (Post_Process_Terminal). The change of the terminal's type serves for correct matching of communicated messages, in principle it can be a new type number of the terminal, e.g. 27. In other case, when it will be problematic to introduce new type number of the terminal into existing processing systems, the same type number 12 and different terminal capability can be used, here it is expressed as 12tc2=12 with different tc—terminal capability. Terminal 2 has a memory to store an answering file ARPC as a preparation for realization of the reconnection of the communication link 3 with a card 1.

Data about a required payment which include an amount, currency and a date are prepared in the terminal 2. These are included in CDOL1 data (Card Risk Management Data Object List). The user applies his mobile phone to the terminal 2 reader. After the communication link 3 is created, the terminal 2 asks the card 1 for a statement. On the basis of the received data, the card 1 will create a payment file in the form of the ARQC cryptogram. This file is encoded by electronic signature of the card 1. During the originally created communication link 3 a payment file ARQC is transferred into a terminal 2. After its creation, the ARQC payment file is stored in the secure element on the card 1. After transfer of the ARQC payment file into the terminal 2, basically it does not matter if the mobile phone is moved away from the terminal's 2 reader or not. It is supposed that the phone will be moved away since the mobile phone will be held by the user's hand during the whole payment transaction. The mobile phone will be placed near to the terminal's 2 reader at the request of the terminal 2, or actually at the request of an attendant who monitors the whole course of the payment transaction. After the first placement, the user waits for another request for placement. The communication link 3 between the card 1 and the terminal 2 is disconnected when one payment transaction is in progress.

Meanwhile, the ARQC payment file is sent from the terminal 2 to the payment processor 5. The payment processor processes it, evaluates it and together with possible other instructions encodes the ARQC payment file into an answering file in the form of the ARPC cryptogram. This file encompasses encoded data about the ARQC payment file. The ARPC answering file is received by the card 1 from a payment processor 5 after the original communication link 3 between the card 1 and terminal 2 is interrupted. This interruption contains a time element for the moment which separates the first and the second phase of the payment transaction processing. From the card's 1 point of view these two are phases separated by the card 1 being reset, while the data created on the card during the first phase are used in the second phase.

The ARQC payment file is stored in the card's 1 memory at least until the moment when the particular ARPC answering file from the payment processor 5 is received and processed. The card 1 decodes the received ARPC answering file, gains information about ARQC payment file which was used by a payment processor 5 when creating ARPC answering file. Next, the card 1 compares the originally created and stored ARQC payment file with ARQC payment file which is included in the ARPC answering file. After this comparison the card 1 can make decision on its statement concerning the payment in process. Subsequently, the card 1 creates a statement of acceptance or rejection of the payment in TC or AAC form. Statement of acceptance is created on the card 1 under necessary condition when the originally created and on the card 1 stored ARQC payment file is identical to ARQC payment file included in the ARPC answering file.

The connection as described in this example also offers more possibilities of the way how the ARPC answering file is transferred to the card 1. If the terminal 2 reports to the payment processor 5 that the user did not place his mobile phone near to the terminal's 2 reader for the second time, the payment processor 5 will try to send ARPC as SMS data to the phone number assigned to this particular payment card 1. In the mobile phone, the received SMS is analyzed as data relevant to the inserted micro SD card and initializes launch of its own generic, basically virtual POS terminal 2. The SMS message contains information about terminal 2 belonging to the payment processor 5 with prefix 17 (PostProcessingTerminal 2 belonging to the payment processor 5).

Example 2

The process of an on-line payment transaction is realized in two steps—preprocessing and postprocessing. A contactless application fulfilling e.g. PAYPASS and PAYWAVE specification can be used as a payment application. There are two separate applications on the card 1—PAYPASS/PAYWAVE and PAYPASS/PAYWAVE_POSTPROCESS. Applications are located in one Secure Domain and are EMV compatible while they share at least three common variables (Data Element): Off-line Counter, Application Transaction Counter (ATC), Last Online Application Transaction Counter (LATC). The application PAYPASS/PAYWAVE temporary stores the ARQC value, which it provides later in POSTPROCESS to PAYPASS/PAYWAVE_POSTPROCESS application so this one did not have to count it once again, by which time is saved. According to this invention a new type of terminal 2 is introduced: Terminal_Type=27 (POST PROCESS TERMINAL 2).

The presented solution enables to place the mobile phone near the terminal 2 twice. The first time, a request for an on-line authorization is generated and after the second touch, the information from the payment processor 5 is entered into the payment application. If the user does not place his mobile phone for the second time but relevant data or a script are within the answer, the terminal 2 reports to the payment processor 5 that the answer was not delivered and the payment processor 5 will try to deliver it once more into the mobile phone via SMS—in case the SMS RESPONSE service is activated. In case the user has this service, he can place his mobile phone near to the terminal's 2 reader only once also willingly and regularly. The service is activated during the first installation of GUI when GUI reports to the payment processor 5 via SMS that SMS REPORT was enabled.

The service is disabled automatically in case when the payment processor 5, after he sends SMS RESPONSE, does not receive a confirmation of its reception in three consecutive on-line payments. The client pays on-line 3 times consecutively and/or GUI was not activated or his mobile phone was changed for a type not supporting such a service. After deactivation the client will receive an SMS saying that he must either re-activate the service over GUI or use the two-touch method of the payment transaction process.

Also in this example the PreProcessing represents a common on-line contactless operation realized at the first placement of the card 1, herein a mobile phone to the terminal's 2 reader. During preprocessing, the terminal 2 presents itself as e.g. Terminal_type=12 (POS terminal 2 attended by a salesperson). The terminal 2 sends a request for an on-line authorization to the payment processor 5 (authorized server of the bank which issued the payment card 1). The result of the preprocessing is, besides others, a Response_code and a Script from the payment processor.

The user starts the GUI payment application in the mobile phone. The application asks for a password. If the password is applied, then the EMBEDDED POS TERMINAL uses the password to get the PIN code. The PIN code is stored in a separate application in the Secure Element. The EMBEDDED POS TERMINAL verifies the PIN in the PAYPASS/PAYWAVE application and if it is valid, it configures the payment application in such a way that during the transaction no additional verification by PIN over PIN Entry Device (PED) on an external POS terminal 2 is required. A PIN OVER PASSWORD platform technology is defined by this configuration. If the user starts the payment application but does not enter a password and terminal 2 requires a PIN verification, it is necessary to enter PIN over PED or to place FOB (external data carrier) near to the reader and send it for verification to the payment processor 5. If the phone is not equipped with GUI payment application and the terminal 2 requires PIN verification, the verification will be done on-line at the payment processor 5.

The terminal 2 sends Card Risk Management Data Object List (CDOL1) and $1^{st}$ GENERATE AC command to the card 1. The card 1 calculates the ARQC. If the risk management of the terminal 2 requires PIN and no password was entered over GUI, the terminal 2 requires PIN to be entered on the Pin Entry Device (PED) and in this step it verifies the PIN on-line. The terminal 2 sends the calculated ARQC cryptogram as a request for on-line authorization to the payment processor 5. The payment processor 5 sends back the answer (ARPC cryptogram) supplemented for a Response_code and a Script.

The postprocessing runs during the second placement of the card near to the terminal 2 when the terminal 2 sends the Response_code and the Script to the card 1 for next processing as follows:

1. After the terminal 2 receives the ARPC cryptogram from the payment processor (end of preprocessing), the terminal asks the user to place the card 1, the mobile phone near to the contactless reader of the terminal again.
2. After placing the card 1, the terminal 2 activates PAYPASS/PAYWAVE_POSTPROCESS and presents itself not as a Terminal_type=12 but as a Terminal_type=27 (PostProcessingTerminal attended by a salesperson), respectively as a Terminal_type=12 tc2
3. The card recognizes this type of the terminal (it is on the two-touch transaction processing), asks the terminal 2 for CDOL2 data to calculate $2^{nd}$ GENERATE AC.
4. CDOL2 from the terminal 2 must encompass, besides other data, a Response_code from the payment processor.
5. The terminal 2 sends the Script into the card 1.
6. During calculation the ARQC, which was temporary stored during the preprocessing, is used.
7. Card sends the calculated TC/AAC to the terminal 2.

If the user does not place his mobile phone, the mobile communication device 4, to the reader for the second time, the terminal will report to the payment processor 5 that message delivery was unsuccessful. The payment processor will try to send the ARPC as SMS data to the phone number in which the SD card 1 is inserted (the processor 5 gains and remembers this number during activation of SMS Response from the activating SMS from GUI). The push SMS technology records the received SMS and after finding out that it involves relevant data for the SD card, it runs the GENERIC POS TERMINAL. Besides other information, the SMS data must include also information about Terminal_type=17 (PostProcessing Terminal 2 belonging to a financial institution). The GENERIC POS TERMINAL reads configuration data of the default terminal on the secure element (the terminal 2 belonging to the payment processor 5 or to the Payment processor cooperating with the processor 5 of the payment). Subsequently, the EMBEDDED POS TERMINAL starts PAYPASS/PAYWAVE_POSTPROCESS and presents itself as Terminal_type=17. The card 1 recognizes such type of the terminal (it is on the two-touch transaction processing platform), asks the terminal 2 for CDOL2 data (containing ARPC) to calculate $2^{nd}$ GENERATE AC. The terminal 2 sends a Script into the card 1. The ARQC, which was temporary stored during preprocessing, is used for calculation later on. The card 1 sends the calculated TC/AAC as an answer into the terminal 2. The terminal 2 encodes the answer and stores it into the memory from where GUI takes it over and sends its as an answer to the HOST of the processor 5 of the payment whereas it recognizes the phone number from the received SMS RESPONSE.

When the card 1 receives the ARPC from the payment processor 5, it sets the LATC, which enables it to realize other "n" (unlimited) off-line payments and it does not matter whether it is over SMS Response or over second touch. If the user refuses the second touch at the two-touch platform and/or SMS Response is not activated, he will not be able to realize off-line payments. However, he can still pay but only with on-line authorization at the payment processor 5. The off-line transactions will be permitted after ARPC (response) is received correctly from the payment processor 5. Then he will be allowed again to pay unlimited number of times, naturally under the condition that there is enough off-line money on his card.

INDUSTRIAL APPLICABILITY

Industrial applicability is obvious. According to this invention, it is possible to create and use systems for electronic payment applications at which a payment transaction is divided into two phases that enables interruption of a communication link between a card and a terminal.

LIST OF RELATED SYMBOLS

1—a card
2—a payment terminal
3—a communication link
4—a mobile communication device
5—a payment processor
6—a communication path
7—a communication element
POS—point of sale
AAC—Application Authentication Cryptogram
ARQC—Authorization Request Cryptogram
ARPC—Authorization Response Cryptogram
CDOL—Card Risk Management Data Object List
TC—Transaction Certificate
POS 12–point of sale attended by a salesman
POS 12tc2—point of sale attended by a salesman in post process—with different terminal capability
EMV—Europay, MasterCard, VISA

The invention claimed is:

1. A method for performing a contactless electronic payment transaction, the method comprising:
creating a payment file on a removable memory card for a mobile communication device;
communicating the payment file from the card to a payment terminal over a communication link;
interrupting the communication link between the card and the payment terminal;
resetting the card;
restoring the communication link between the card and the payment terminal;
electronically signing the payment file on the card using payment data received from the payment terminal after resetting of the card, wherein the payment file is communicated to a payment processor via the restored communication link between the card and the payment terminal;
receiving from the payment processor an answering file that includes data relating to the payment file in encoded form;
processing the answering file to define a statement of acceptance or rejection of a payment transaction; and
providing the statement of acceptance or rejection to the payment terminal,
wherein data created on the card before the interruption of the communication link are used to complete the payment transaction after resetting the card.

2. The method of claim 1, wherein the electronically signed payment file is stored in a memory on the card at least until the answering file is received from the payment processor, the received answering file is decoded on the card, and the statement of acceptance or rejection is defined based on the data in the answering file relating to the payment file.

3. The method of claim 1, further comprising comparing an originally created payment file that is stored on the card to a payment file that is included in the answering file.

4. The method of claim 3, wherein a statement of approval of the transaction is created if the originally created payment file is identical to the payment file that is included in the answering file.

5. The method of claim 1, wherein, after receiving the answering file, the payment terminal requires restoration of the communication link between the card and the payment terminal, and, after the communication link between the card and the payment terminal is restored, the card asks the terminal to resend payment data supplemented with an answer from the payment processor.

6. The method of claim 1, wherein the removable memory card is in an SD format.

7. The method of claim 1, wherein a communication path used for transferring the answering file is different from a communication path used for transferring the payment file.

8. The method of claim 1, wherein, after receiving the answering file from the payment processor, the terminal contacts the card as a terminal with an identification that is different from an identification of the payment terminal used before the card was reset.

9. The method of claim 8, wherein the payment terminal stores the answering file in preparation for restoring the communication link with the card.

10. The method of claim 8, wherein the answering file is communicated over a mobile communication network, and the answering file is received by the card via the mobile communication device in SMS format.

11. A system for performing a contactless electronic payment transaction, the system comprising:
a payment card in a mobile communication device, wherein the payment card includes a memory having a payment file stored therein;
a communication link;
a payment processor; and
a payment terminal in connection with the payment processor, the payment terminal including a memory for temporary storage of a received answering file from the payment processor including data relating to the payment file in encoded form,
wherein, during operation, the payment card communicates the payment file to the payment terminal over the communication link,
wherein, upon interruption of the communication link between the payment card and the payment terminal the payment card is reset, and upon restoration of the communication link between the payment card and the payment terminal the payment card electronically signs the payment file on the payment card using payment data received from the payment terminal after resetting of the payment card, and wherein the payment file is communicated to the payment terminal via the restored communication link between the payment card and the payment terminal,
wherein the payment processor provides the answering file to the payment card and the payment card processes the answering file to define a statement of acceptance or rejection of a payment transaction and provides the statement of acceptance or rejection to the payment terminal, and
wherein data created on the payment card before the interruption of the communication link are used to complete the payment transaction after resetting the payment card.

12. The system of claim 11, wherein the payment card includes a secure element that resides in a memory thereof for storage of the payment file.

13. The system of claim 11, wherein the payment card resides in a removable memory card for a mobile communication device.

14. The system of claim 11, wherein the payment card includes a contactless communication element for communication with the payment terminal.

15. The system of claim 11, wherein the payment card is adapted to retain the payment file in the memory after a reset of the payment card following an interruption of the communication link between the payment card and the payment terminal.

16. The system of claim 11, wherein the payment terminal has registry identification data associated therewith, and the payment terminal is adapted to change registry identification data after the answering file is received.

\* \* \* \* \*